(12) United States Patent
Anusuri et al.

(10) Patent No.: US 12,314,157 B2
(45) Date of Patent: May 27, 2025

(54) DATA PIPELINE VALIDATION

(71) Applicant: Wells Fargo Bank, N.A., San Francisco, CA (US)

(72) Inventors: Vijay Anusuri, Charlotte, NC (US); James Bell, Charlotte, NC (US); Daniel Herrera, Charlotte, NC (US); Michael A. Hopkins, West Des Moines, IA (US); Ramesh Joshi, Charlotte, NC (US); Sameer Joshi, Charlotte, NC (US); Kanth Nagapudi, Charlotte, NC (US); Kiran Siripurapu, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 136 days.

(21) Appl. No.: 18/349,261

(22) Filed: Jul. 10, 2023

(65) Prior Publication Data
US 2025/0021469 A1   Jan. 16, 2025

(51) Int. Cl.
*G06F 11/3668*   (2025.01)
(52) U.S. Cl.
CPC ............................... *G06F 11/3684* (2013.01)
(58) Field of Classification Search
CPC ........ G06N 20/00; G06N 3/08; G06F 16/211; G06F 16/254; G06F 11/3668; G06F 11/3672; G06F 11/3684
See application file for complete search history.

(56) References Cited

U.S. PATENT DOCUMENTS

| | | | |
|---|---|---|---|
| 7,401,094 B1 | 7/2008 | Kesler | |
| 7,631,227 B2 | 12/2009 | Muma et al. | |
| 8,887,135 B2 | 11/2014 | Banerjee et al. | |
| 9,047,414 B1* | 6/2015 | Matyjek | G06F 11/3692 |
| 9,229,952 B1 | 1/2016 | Nguyen et al. | |
| 10,114,738 B2* | 10/2018 | Dsouza | G06F 11/3688 |
| 10,122,783 B2 | 11/2018 | Botev et al. | |
| 10,268,742 B2 | 4/2019 | Adya et al. | |
| 10,642,721 B2* | 5/2020 | Kulkarni | G06N 5/02 |
| 10,838,848 B2* | 11/2020 | Fong | G06N 3/045 |
| 10,983,967 B2 | 4/2021 | Tsirogiannis et al. | |
| 2018/0210822 A1* | 7/2018 | Saginaw | G06F 11/3698 |
| 2021/0133087 A1* | 5/2021 | Sundararaman | G06F 11/3688 |
| 2021/0365312 A1 | 11/2021 | Devaraju | |

(Continued)

*Primary Examiner* — Michael Maskulinski
(74) *Attorney, Agent, or Firm* — Merchant & Gould P.C.

(57) ABSTRACT

A data pipeline validation system and method configured to partially automate testing of data pipelines in a distributed computing environment. The system includes a data pipeline analytic device equipped with various modules, such as a query generation module, data frame comparison module, and metadata management module. The query generation module employs natural language processing techniques to analyze configuration entries and dynamically generate SQL queries tailored to specific test cases. The data frame comparison module compares the results of different test cases using distributed collections, enabling parallel processing and efficient result comparison. The metadata management module captures and stores relevant metadata for traceability and auditing purposes. The system facilitates comprehensive validation of data pipelines, enabling organizations to ensure the accuracy, reliability, and integrity of data.

16 Claims, 4 Drawing Sheets

(56) References Cited

U.S. PATENT DOCUMENTS

| | | |
|---|---|---|
| 2022/0398186 A1 | 12/2022 | Mudumba |
| 2023/0068513 A1 | 3/2023 | Kundu et al. |
| 2023/0268068 A1* | 8/2023 | Doyen .................. G06T 7/0012 705/2 |

* cited by examiner

DATA PIPELINE VALIDATION

BACKGROUND

A data pipeline is a process that extracts, transforms, and loads data from various sources to a target system. One common example of a data pipeline in the financial industry is the process of aggregating and analyzing transactional data from multiple sources, such as banking systems, trading platforms, and customer interactions. Regular testing and validation of data pipelines are necessary to ensure data accuracy, adapt to changing requirements, and comply with regulations. However, testing can be time-consuming due to multiple components, large data volumes, performance considerations, and the need for thorough data validation.

SUMMARY

The present disclosure relates to a data pipeline testing system, product, or method that aims to automate the validation of data pipelines, ensuring accuracy and reliability throughout the data processing workflow. The system, product and method receive test cases in a predefined format, generates dynamic SQL for testing purposes, and utilizes distributed collections for efficient result comparison and in-memory processing to enable streamlined and scalable data pipeline validation to enhance the reliability and accuracy of data processing systems.

Examples provided herein are directed to a method for validating a data pipeline in a distributed computing environment, including receiving a test case from a client device, parsing the test case to extract one or more configuration entries, analyzing the one or more configuration entries to determine an associated one or more functions, selecting one or more prewritten modules to perform the one or more functions, determining a run time order for the selected one or more prewritten modules, and assembling the one or more prewritten modules together to form a test plan.

In some examples, the method further includes executing the test plan on the distributed computing environment, and storing relevant metadata associated with validation results obtained from execution of the test plan. In some examples, the method further includes comparing the validation results with one or more expected results.

In some examples, the method further includes processing via a natural language processing algorithm to analyze the one or more extracted configuration entries to determine the associated function. In some examples, the method further includes training the natural language processing algorithm using a body of configuration entries and their corresponding desired associated functions.

In some examples, the method further includes establishing a connection between the client device, the relational data store, and a test plan repository configured to store the one or more prewritten modules. In some examples, the test case is represented in a JavaScript Object Notation format. In some examples, the test plan is represented in a dynamic Standard Query Language format, enabling modification of portions of a Standard Query Language format code with relevant variable values. In some examples, the test case is configured to be executed in parallel across at least two nodes or machines of the relational data store. In some examples, the validation results are stored in one node or machine of the relational data store.

Another example provided herein is directed to a computer system for file aggregation, comprising: one or more processors; and non-transitory computer readable storage media encoding instructions which, when executed by the one or more processors, causes the computer system to: receive a test case from a client device; parse the test case to extract one or more configuration entries; analyze the one or more configuration entries to determine an associated one or more functions; select one or more prewritten modules to perform the one or more functions; determine a run time order for the selected one or more prewritten modules; and assembly the one or more prewritten modules together to form a test plan.

Another example provided herein is directed to a computer program product residing on a non-transitory computer readable storage medium having a plurality of instructions stored thereon, which when executed by a processor, cause the processor to perform operations for file aggregation including: receiving a test case from a client device; parsing the test case to extract one or more configuration entries; analyzing the one or more configuration entries to determine an associated one or more functions; selecting one or more prewritten modules to perform the one or more functions; determining a run time order for the selected one or more prewritten modules; and assembling the one or more prewritten modules together to form a test plan.

In some examples, the one or more configuration entries specify at least one of a data source within the distributed computing environment, one or more transformations or calculations to be applied to data within the distributed computing environment, a target store where data from the distributed computing environment is loaded, or expected results for validating aspects of the data pipeline in the distributed computing environment.

The details of one or more techniques are set forth in the accompanying drawings and the description below. Other features, objects, and advantages of these techniques will be apparent from the description, drawings, and claims.

DETAILED DESCRIPTION

Figure 1:
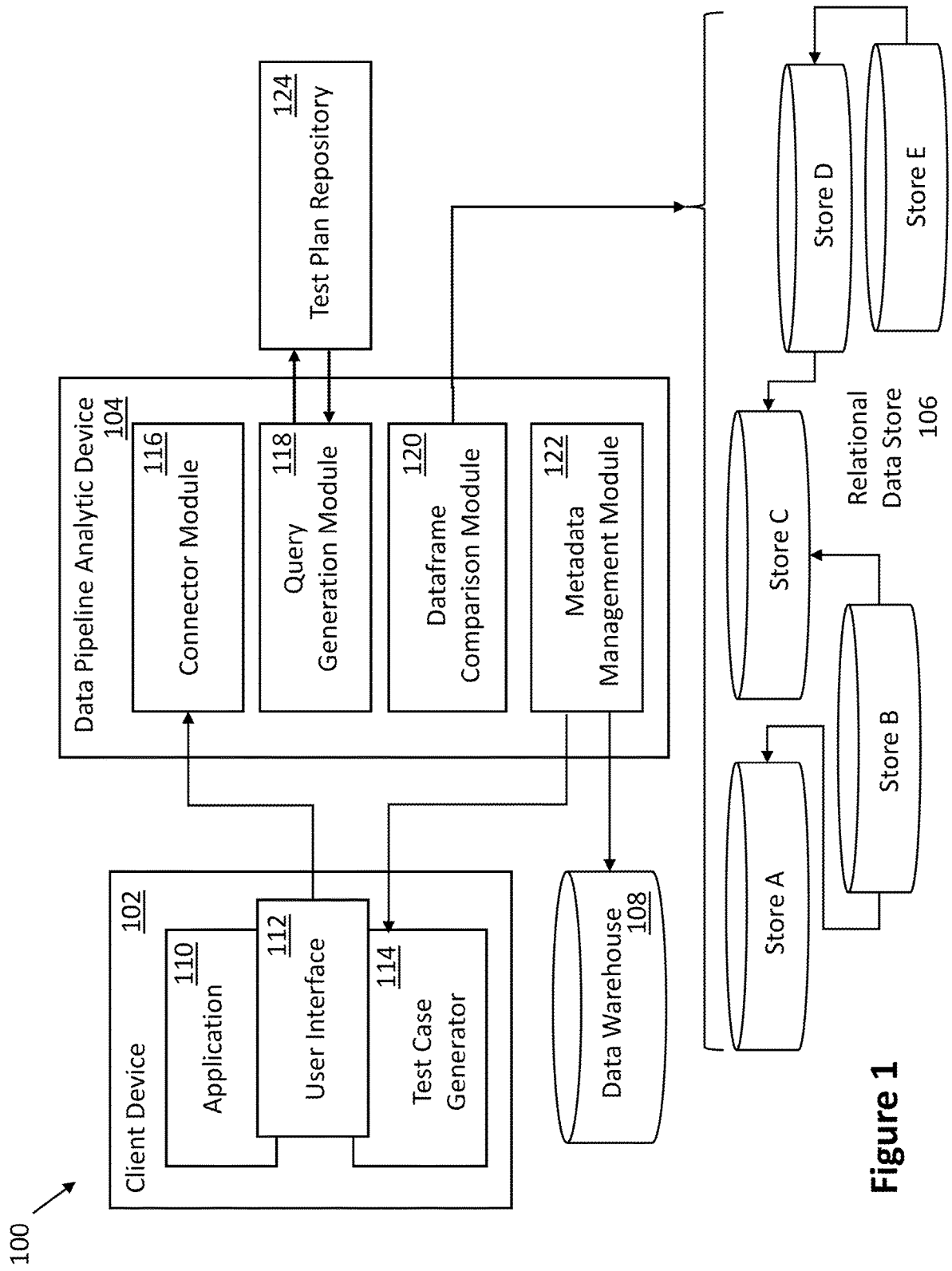
FIG. 1 shows an example data pipeline validation system including a data pipeline analytic device for validating a data pipeline in a distributed computing environment.

This disclosure relates to an integrated framework to partially or fully automate data pipeline validation.

The concepts described herein provide a data pipeline testing system, product and method configured to streamline the testing process and mitigate the challenges of data pipeline validation. In some examples, the platform can receive a test case in a predefined format, generate dynamic test plans, and utilize distributed collections of validation results for efficient result comparison. Moreover, in some embodiments the platform enables the execution of Standard Query Language (SQL) queries in a distributed computing environment representing an improvement in scalability, performance, and fault tolerance. Financial institutions and other organizations can leverage these capabilities to reconcile transactions, process large volumes of data, and achieve faster query response times. The distributed collections store validation results, enabling parallel processing, faster access, and scalability for comprehensive data pipeline validation.

A data pipeline refers to a series of interconnected processes that extract, transform, and load data from various sources to a target system, facilitating the flow of data throughout an organization. One common example of a data pipeline in the financial industry is the process of aggregating and analyzing transactional data from multiple sources, such as banking systems, trading platforms, and customer interactions. This data pipeline collects raw transactional data, applies various transformations and calculations, and loads the transformed data or calculations into a centralized data warehouse or analytics platform, which can be used for various purposes, including risk analysis, fraud detection, regulatory compliance, and business intelligence.

Periodic testing and validation of data pipelines is an important part of maintaining data integrity, mitigating risks, and meeting regulatory requirements. By conducting regular testing, organizations can identify and rectify issues early on, ensuring continued accuracy and reliability of the data. The periodic testing may focus on different aspects of the data pipeline.

For example, the validation may focus on data extraction to verify that data is accurately sourced from various systems, such as banking systems, trading platforms, and customer interactions, by comparing the extracted data against the expected values. The validation may focus on data transformation to validate the correctness of transformations and calculations applied to the raw transactional data, which can involve checking the accuracy of aggregations, calculations of financial metrics, and ensuring compliance with business rules.

The validation may focus on data loading to confirm that the transformed data or calculated results are accurately loaded into the centralized data warehouse or analytics platform, which can be done by comparing the loaded data against the source data and verifying the completeness and integrity of the loaded information. The validation may assess the quality of the data throughout the pipeline, including checking for consistency, accuracy, completeness, validity, uniqueness, and adherence to predefined data quality standards, which can involve data profiling, anomaly detection, and checks for data conformity. The validation may focus on business rule validation to ensure that the data pipeline adheres to specific business rules and requirements (e.g., verifying compliance with regulatory standards, identifying potentially fraudulent activities, or ensuring risk analysis calculations are accurate and reliable).

Additionally, as new data sources are added, transformations are modified, or target systems are upgraded, validation may be desired to ensure that the pipeline continues to function properly and adheres to operational requirements. When new data sources or target systems are integrated into the pipeline, it may be desirable to verify that the extraction processes can accurately fetch data from the new data sources and that the transformations and calculations are compatible with the new data formats. Conducting periodic testing and validation enables organizations to ensure that modifications to transformations are properly implemented and do not introduce errors or inconsistencies into the data pipeline.

Periodic testing and validation of data pipelines can be a time-consuming process due to various factors, including the complexity of interconnected components, handling large data volumes, performance testing requirements, data quality validation, test maintenance and updates, and troubleshooting and issue resolution. The present disclosure offers a solution through a data pipeline testing platform or framework configured to partially automate the validation process. In embodiments, the partial automation can be accomplished through the platform's capability to receive a test case in a predefined format, generate dynamic test plans for testing, and leverage distributed collections of validation results organized for efficient result comparison and in-memory processing. As a result, embodiments of the present disclosure streamline the testing process and aid in mitigating the laborious nature associated with data pipeline validation.

In the context of data pipeline validation, a test case refers to a specific scenario or set of conditions that are designed to verify the correctness, functionality, or performance of a system or component. The test case can outline the steps, inputs, expected outputs, and criteria for determining the success or failure of the validation. The test case can be written in a predefined format, and can contain information about the desired behavior, expected results, and specific aspects of the data pipeline to be tested.

Specifically, each test case can contain one or more configuration entries referring to a specific configuration setting, instruction, element, or parameter that guides behavior of the data pipeline testing framework. For example, the configuration entries may specify the source systems from which data will be extracted, such as banking systems, trading platforms, or customer interaction databases.

The configuration entries may include instructions defining the transformations and calculations to be applied to the extracted data, such as aggregations, filtering, or data cleansing operations. The configuration entries may provide details about the destination or target system where the transformed data or calculated results will be loaded, such as a data warehouse or analytics platform. The configurations may specify the expected results or criteria for validating the accuracy, completeness, or adherence to predefined business rules of the data pipeline. Accordingly, the configuration entries generally serve as inputs to the data pipeline testing framework.

In some embodiments, the test case can be represented in a predefined JavaScript Object Notation (JSON) format. JSON is a popular lightweight data interchange format known for its readability and ease of parsing and generation by both humans and machines, which uses a text-based format represented as structured data using key-value pairs, arrays, and nested objects to represent the configuration entries. While JSON is a readily accessible format for representing test cases, alternative formats are also contemplated. For example, the test cases may be represented in extensible Markup Language (XML), Yet Another Markup Language (YAML), Excel/Spreadsheet formats, Comma-Separated Values (CSV), or in plain text.

Thereafter, the data pipeline testing framework can use the configuration entries of the test case to create a test plan, which can be configured to enable execution of the validation process to ensure that the data pipeline meets the defined requirements and performs as expected. In some embodiments, the test plan can be in a SQL format. SQL is a standard programming language used for managing and manipulating relational databases, which provides a set of commands and syntax for defining, querying, updating, and managing data in Relational Database Management Systems (RDBMS). In other embodiments, the test plan can be in the form of a graph query language, functional query language object relational mapping framework, data flow language, or the like.

In some embodiments, the test plan can be generated in a dynamic SQL format. Dynamic SQL allows for the generation and modification of SQL statements at runtime based on varying conditions or inputs. Dynamic SQL offers flexibility by incorporating runtime values or variables into queries. For example, consider a data pipeline that aggregates and analyzes daily sales data. As part of the test plan, a runtime variable can be used to specify the start and end dates of the data extraction and validation process. During each test execution, the date range variable can be updated to cover different time periods, such as one week, one month, or a specific quarter. By utilizing a runtime value or variable for the date range, the test plan becomes adaptable, enabling the validation of the data pipeline's functionality and accuracy across various timeframes. By contrast, traditional SQL (sometimes referred to as static SQL) has fixed SQL statements determined during coding or design-time, which limits adaptation to evolving testing requirements.

The process of generating a test plan on the platform involves taking the configuration entries from the test case, selecting appropriate Python modules from a repository, and assembling the Python modules together to form the test plan. For example, in one embodiment, the platform can read and parse the test case, which can be provided in a predefined format like JSON, thereby enabling the platform to access the configuration entries contained within the test case. The platform can examine the configuration entries to analyze the required functionalities, such as data extraction, transformation, loading, or validation.

Based on the analysis of the configuration entries, the platform can select the appropriate Python modules that provide the necessary functionality. The Python modules are collections of Python code that provide reusable functions, classes, and other components to perform specific tasks. In embodiments, the Python modules can be custom-built modules or existing modules from repositories or libraries that offer the desired capabilities, such as data extraction, transformation, or validation. The platform can integrate the selected Python modules, combining them to form the test plan. In some embodiments, the integration can involve defining the sequence of steps and operations to be performed by each module within the plan, wherein the specific logic and sequence depends on the requirements and flow specified in the test case configuration entries.

Once a sequence of the Python modules is determined, the platform configures the Python modules with the relevant parameters and data from the configuration entries and assembles the Python modules together to form the test plan, thereby enabling the Python modules to interact and execute in a coordinated manner.

In some embodiments, the Python modules can be utilized to generate dynamic SQL statements or to interact with SQL databases, which can incorporate variables, conditions and other dynamic elements as needed. Further, the Python modules can be used to establish connections with SQL databases, execute SQL queries, retrieve data and perform data manipulations. Accordingly, the test plan represents a comprehensive set of instructions (e.g., Python modules) for executing the data pipeline validation.

In some embodiments, the platform offers the capability to execute SQL queries within a distributed computing environment, where data is distributed across multiple nodes or machines. For example, in one embodiment, the data can be distributed and stored across multiple nodes forming a node cluster including a master node, which manages the overall coordination, and worker nodes that process the data in parallel. Accordingly, financial data (e.g., transaction records or market data) can be partitioned into smaller chunks called Resilient Distributed Datasets (RDDs), with each partition potentially stored on a different worker node.

Thereafter a distributed computing engine can execute tasks in parallel across the worker nodes, causing each worker node to process the data within its assigned partition, performing computations and transformations as needed. Unlike traditional SQL databases that process queries on a single machine or server, a distributed setup partitions and stores data across multiple nodes, allowing for parallel processing and improved scalability and performance. The underlying purpose of a distributed computing environment is to harness the combined computational power and resources of interconnected nodes or machines to efficiently tackle intricate computational challenges and handle substantial data volumes.

By executing SQL queries on distributed datasets, the platform can handle larger volumes of data and increased query complexity by distributing the workload across multiple nodes. Moreover, execution of queries on distributed datasets can significantly improve query response times, as the workload is distributed among multiple computing resources. Additionally, the platform may have a built-in fault tolerance mechanism, enabling the platform to recover from node failures and ensure query execution continuity. Additionally, by executing queries directly on the nodes where the data resides, the platform can reduce data movement and network overhead, resulting in faster query processing.

Accordingly, operational use of parallel nodes allows for a more efficient utilization of computational resources and faster data processing. These features are particularly relevant for platforms that work with big data frameworks (e.g., Apache Hadoop, Apache Spark, etc.) where data is stored and processed in a distributed manner across a cluster of machines. Additionally, the platform can facilitate data movement between worker nodes in the cluster as required.

In some embodiments, the platform is configured to store the validation results in distributed collections, enabling a more efficient comparison of validation results. In particular, by organizing the validation results in a distributed manner, the platform can perform parallel processing and comparison operations across the distributed nodes, accelerating the result comparison process. Moreover, the distributed collections are stored in-memory, meaning that the data is held in the memory of the distributed nodes, which enables faster access and processing of the validation results compared to traditional disk-based storage. Additionally, the distributed collections provide scalability, enabling the platform to scale horizontally by adding more nodes to the cluster allowing for seamless expansion as the volume of the test data increases.

For example, in one embodiment, the platform can perform a daily reconciliation of trade transactions between different systems in a financial institution. As part of the validation process, the platform compares the transaction records from each system and generates reconciliation reports, which provide insights into any discrepancies or inconsistencies between the systems. In a distributed computing environment, the platform executes the validation process across multiple nodes, with each node responsible for processing a subset of the transaction data. Once the validation is completed, the validation results are organized and distributed across the nodes in a distributed collection. By organizing the validation results in a distributed manner, financial institutions can leverage parallel processing capabilities, distribute the workload, and efficiently handle large-scale data validations.

The described system, product, and method offer several advantages, particularly enhancing the efficiency, effectiveness, and reliability of data pipeline validation, ensuring data integrity and meeting regulatory requirements Other non-limiting advantages of the data pipeline validation system, product and method include:

Streamlined Validation process: The can automate and streamline the validation process for data pipelines, reducing the manual effort and time required for testing, thereby enabling organizations to conduct periodic testing more efficiently and effectively.

Improved Scalability, Performance, and Fault Tolerance: By leveraging distributed computing environments, the system can achieve enhanced scalability, performance, and fault tolerance. Additionally, the system can handle larger volumes of data, process complex queries, and execute tasks in parallel across multiple nodes, thereby improving query response times and enabling uninterrupted execution in the event of node failures.

Comprehensive Data Pipeline Validation: The system can provide comprehensive validation capabilities throughout the data pipeline, including data extraction, transformation, loading, and quality assessment, enabling organizations to verify the accuracy, completeness, consistency, and adherence to predefined business rules of their data pipelines.

Faster Query Response Times: By executing SQL queries directly on the nodes where the data resides, the system can minimize data movement and network overhead, resulting in faster query processing, which can be particularly advantageous when working with large datasets and complex queries.

Efficient Result Comparison: The system can employ a distributed computing framework, to store and organize validation results in distributed collections, allowing for parallel processing and comparison operations across distributed nodes, accelerating the result comparison process. Furthermore, storing the collections in-memory enables faster access and processing compared to traditional disk-based storage.

Scalability for Growing Data Volumes: With the ability to scale horizontally by adding more nodes to the cluster, the system can handle increasing volumes of test data seamlessly to ensure that as the data pipeline and testing requirements grow, the system can accommodate the expanding workload without sacrificing performance.

Compliance and Risk Mitigation: By conducting regular testing and validation, organizations can ensure compliance with regulatory standards, identify potentially fraudulent activities, and mitigate risks associated with data integrity. The system provides the necessary tools to validate the data pipeline's adherence to specific business rules and requirements.

The described data pipeline orchestration system offers several benefits, including time and cost savings through automation, enhanced efficiency of data pipelines, scalability and improved performance, comprehensive validation capabilities, flexibility and adaptability, improved data comparison and analysis, and compliance and risk mitigation. These benefits contribute to operational efficiency, data integrity, and regulatory compliance for organizations using the system.

FIG. 1 schematically shows aspects of one example data pipeline validation system 100 programmed to automate and streamline the testing process, ensure data integrity, identify and rectify issues, optimize performance, and meet regulatory requirements. The system 100 can be a computing environment that includes a plurality of client and server devices. As depicted, the system 100 can include a client device 102, a data pipeline analytic device 104, a relational data store 106, and a data warehouse 108. The client device 102, data pipeline analytic device 104 relational data store 106 and data warehouse 108 can communicate through a network to accomplish the functionality described herein.

Each of the devices of the system 100 may be implemented as one or more computing devices with at least one processor and memory. Example computing devices include a mobile computer, a desktop computer, a server computer, or other computing device or devices such as a server farm or cloud computing used to generate or receive data. Although only a few devices are shown, the system 100 can accommodate hundreds or thousands of computing devices.

The relational data store 106 is programmed to efficiently store and manage various types of information, such as customer data, financial transactions, risk and compliance data, market data, and internal operations data. The relational data store 106 achieves this by utilizing a relational database, which is a type of DataBase Management System (DBMS) that organizes and stores data in separate nodes or entities (e.g., Store A, Store B, Store C, Store D, Store E, etc.), where each node or entity represents a specific database, table or concept, and relationships between entities are defined through keys.

The data in the relational data store 106 can be saved in various formats, depending on specific requirements and use cases. For instance, one common format is Comma-Separated Values (CSV), where each line represents a record and fields within the record are separated by commas. However, other formats for storing data in the relational data store 106 are also contemplated. For example, one or more of the entities may be configured to store data records in a variety of formats, including text and image documents.

To access and manage the data stored in the relational data store 106, one or more Relational Database Management Systems (RDBMS) (e.g., Oracle, SQL Server, Teradata, etc.), can be utilized to provide tools and interfaces for interacting with the data, executing queries, and performing data manipulations. In some embodiments, the relational data store 106 can store data in a NoSQL database, such as MongoDB, which utilizes a document-oriented format, enabling efficient handling of unstructured and semi-structured data. In some embodiments, the data can be stored in data lake clusters or other storage systems specifically designed to handle large volumes of structured and unstructured data.

In some embodiments, the data in the relational data store 106 can be stored in cloud-based storage solutions (e.g., Amazon S3, Google Cloud Storage, or Microsoft Azure Blob Storage, etc.), which can provide scalable and reliable storage options. In certain embodiments, the relational data store 106 can be a distributed file system, allowing data to be stored and managed across multiple nodes within a cluster, which can facilitate parallel processing and improved fault tolerance.

During the data pipeline validation process, the system 100 generates validation results, which can be stored (e.g., in the data warehouse 108) for further analysis and comparison. Each validation result can correspond to a specific test case, and the results can include attributes of the validation results required by the test case. For example, each test case may include columns such as test case ID, timestamp, validation status, error messages, and other relevant information necessary for proper result tracking and analysis. To facilitate storage, the system 100 can employ a data warehouse 108 as a dedicated repository or database to store the validation results.

One example structure for the data warehouse 108 is Hive, which is a data warehouse infrastructure built on top of Hadoop, specifically designed for efficient querying and analysis of large datasets. Such a storage facility can provide a SQL-like interface that simplifies the querying and management of data stored in a Hadoop Distributed File System (HDFS). In the context of the data warehouse 108, a Hive database can be utilized to effectively store and organize the validation results generated during the data pipeline validation process.

In the example depicted in FIG. 1, the client device 102 hosts an application 110 that interacts with data pipeline analytic device 104 through an Application Programming Interface (API) or other mechanism, enabling the execution of various enterprise-related functions. For instance, the system 100 can manage financial services data in a relational data store 106, and the client device 102 can be programmed to access data from the relational data store 106 to facilitate or validate financial services, procedures or protocols.

As further depicted, the application 110 is equipped with a user interface 112 to facilitate user interaction. For example, the user interface 112 can be configured to enable users to input test cases and configuration entities, providing a user-friendly and intuitive way to specify the desired behavior, expected results, and specific aspects of the data pipeline to be tested.

Furthermore, in certain embodiments, the application 110 is equipped with a test case generator 114 configured to facilitate the temporary storage and manipulation of test cases and test plans generated by the data pipeline analytic device 104. In particular, the test case generator 114 can aid in the efficient management and manipulation of the test plans, enabling users to modify, update, and organize test plans as needed within the application 110, thereby enhancing flexibility and ease of use when working with test plans, to enable seamless integration and interaction between the data pipeline analytic device 104 and the client device 102.

On the client device 102, a test case containing one or more configuration entries can be created using a predefined format, which can provide a structured way to define the desired behavior, inputs, expected outputs, and specific aspects of the data pipeline to be tested. In general, the test case format may include key-value pairs, arrays, or nested objects to represent the configuration entries. These entries can contain information about various aspects of the test, such as source systems, transformations, target systems, validation criteria, and other relevant details.

For example, in one embodiment, the test case can include configuration entries that specify the source systems (e.g., a banking system, trading platform, customer interactions, etc.) from which the data will be extracted. The configuration entries can specify transformations, such as aggregation by a particular field (e.g., customer ID, etc.), or calculation of a variable (e.g., a foreign transaction amount converted to US dollars based on a current exchange rate, etc.). The configuration entries may provide details about the destination or target system where the transformed data or calculated results will be loaded, such as a data warehouse or analytics platform. The configuration entries can also define validation criteria (e.g., verify that the converted US dollar amounts fall within an expected range, etc.), and other integrity checks to comply with business rules.

In some embodiments, the test case generator 114 can employ the JSON parsing capabilities to extract the configuration entry information from the test case, enabling the generation of dynamic and customized test plans based on the extracted data. Once created on the client device 102, the test case can be communicated to the data pipeline analytic device 104, which processes the test case to execute the validation process according to the specified configuration entries. The data pipeline analytic device 104 can include a connector module 116, a query generation module 118, a data frame comparison module 120, and a metadata management module 122.

Figure 3:
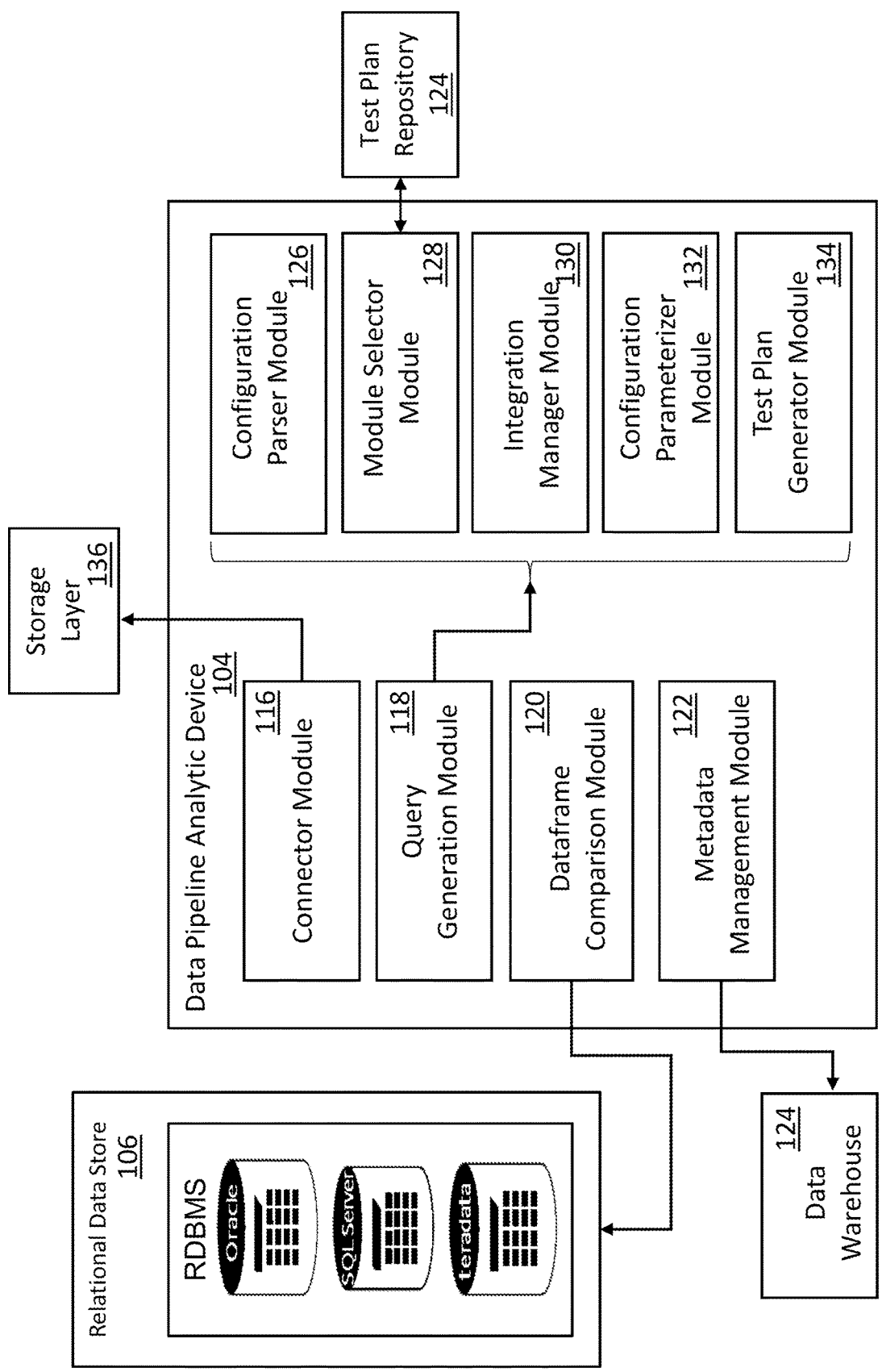
FIG. 3 shows an example of the data pipeline analytic device of FIG. 1.

The connector module 116 can be configured to establish connections between the client device 102, the relational data store 106, and the test plan repository 124. Specifically, the connector module 116 is designed to receive the test case from the client device 102. Based on the configuration entries, the connector module 116 establishes secure and efficient connections between the relational data store 106 and the test plan repository 124, enabling the data pipeline analytic device 104 access a library of preestablished Python modules for generating the test plan. In some embodiments, information representing established connections or keys between the various repositories, databases, nodes, devices and units can be stored in a storage layer 136 (as depicted in FIG. 3).

The query generation module 118 is configured to generate SQL statements based on the configuration entries present in the test case to provide instructions on data extraction, transformations, and other relevant operations to be performed during the validation process. The query generation module 118 analyzes the configuration entries within the test case and interprets the configuration entries to generate SQL statements (e.g., via one or more Python modules) tailored to the specific requirements of each test case. The query generation module 118 adapts to the provided instructions and constructs SQL queries that align with the desired behavior and expected results of the data pipeline being tested.

In some embodiments, query generation module 118 can operate by parsing the test case to isolate and interpret the configuration entries. Specifically, each configuration entry can be identified as representing a specific description, classification, or proposed function that guides the behavior of the data pipeline being tested. By analyzing the descriptions and classifications, the query generation module 118 identifies the relevant configuration entries and their associated functionalities. The query generation module 118 then leverages this information to determine which specific Python modules from the test plan repository 124 may be employed to fulfill the desired operations and transformations.

The test plan repository 124 serves as a library or collection of preestablished Python modules that cater to different aspects of the data pipeline testing process. These Python modules offer the necessary functionalities, such as data extraction, transformation, loading, validation, and the like. Once identified, the query generation module copies the appropriate Python modules from the test plan repository 124 and assembles the modules together to form a test case. This integration process can involve defining the sequence of steps and operations to be performed by each Python module within the test plan, which can be based on the requirements and flow specified in the configuration entries of the test case.

In some embodiments, the query generation module 118 can be configured to generate the test case using SQL statements. For example, in some embodiments, the test case can be expressed in a dynamic SQL format, enabling the test case to be dynamically generated or modified at runtime based on varying conditions or inputs such that the test case can be adapted to specific scenarios and evolving testing requirements. For example, a dynamic SQL test case can be used to incorporate runtime values or variables into the queries, allowing the test case to handle different data sets, timeframes, or specific conditions during each execution.

The data frame comparison module 120 is configured to execute the test case and perform the necessary validation procedures to verify the correctness, accuracy, and consistency of the data flowing through the pipelines defined within the relational data store 106. To enhance efficiency, in some embodiments, data frame comparison module 120 can leverage distributed collections (e.g., Spark DataFrames), which enable the data frame comparison module 120 to efficiently store and process the validation results, enabling the data frame comparison module 120 to perform result comparison and analysis in a highly efficient manner.

For example, the system 100 can be configured to perform a daily reconciliation for trade transactions within a financial institution, which can involve comparing transaction records from different systems and generating reconciliation reports to identify any discrepancies or inconsistencies. To handle the volume and complexity of the data, the validation process can be executed in a distributed computing environment across multiple nodes or entities (e.g., Store A, Store B, Store C, Store D, Store E). Each node or entity can process a subset of transaction data, enabling parallel processing and workload distribution. Upon completion of the validation, the validation results can be organized and distributed across the nodes or entities using a distributed collection to harness the benefits of parallel processing, effectively manage large-scale data validations, and ensure efficient handling of the workload.

The metadata management module 122 is configured to ensure that relevant metadata associated with the validation process is recorded and retained for future reference. For example, the metadata management module 122 can be configured to capture information such as execution timestamps, test configurations, parameters, and other pertinent details related to the testing activities, which can provide a record of the testing activities, enabling traceability, auditability, and compliance with regulatory requirements.

By capturing and storing metadata, the metadata management module 122 facilitates the ability to track and analyze the testing process over time. The metadata management module 122 supports traceability by enabling users to trace the execution history of specific tests, identify the associated configurations, and understand the context of the validation results. Moreover, the metadata management module 122 ensures the availability of important information for audit purposes, thereby enabling organizations to demonstrate compliance with industry regulations and internal policies by maintaining a comprehensive record of the testing activities, which can be used to verify the adherence to predefined standards, track the resolution of issues, and provide evidence of a thorough validation process.

Additionally, the metadata management module 122 facilitates analysis and reporting by providing access to the captured metadata. Users can leverage information collected by the metadata management module 122 to generate reports, perform trend analysis, identify patterns, and gain insights into the overall performance and effectiveness of the data pipeline validation.

Figure 2:
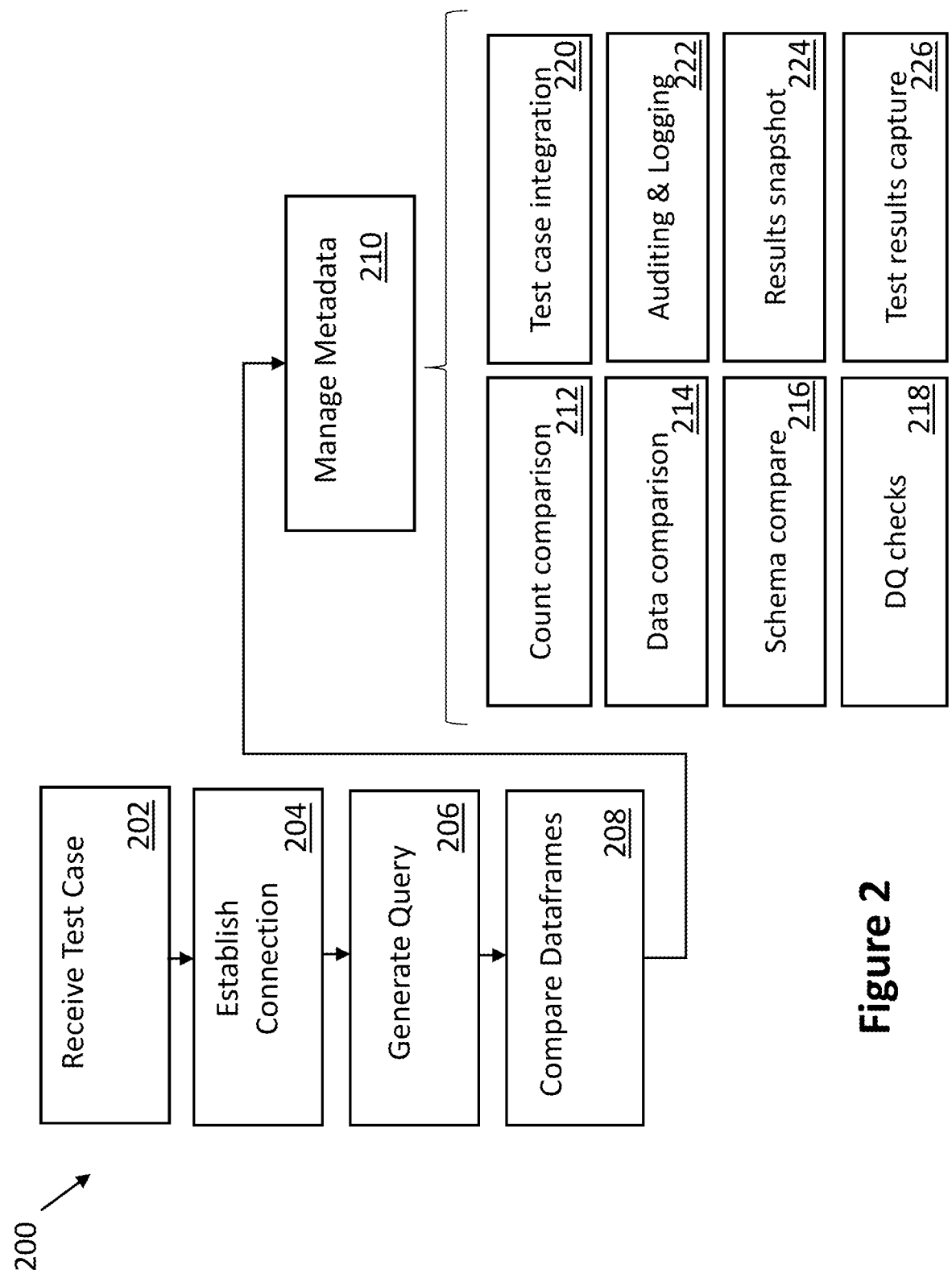
FIG. 2 shows an example data pipeline validation method for validation of a data pipeline within a distributed computing environment.

Referring now to FIG. 2 an example computer implemented method for a data pipeline validation method 200 is shown. This example method 200 can be performed by the system 100 described above.

At operation 202, a test case can be received (e.g., via the data pipeline analytic device 104). The test case can contain instructions, configurations, and parameters (e.g., configuration entries) that define a specific validation scenario for the data pipeline. The configuration entries can include information such as data sources, transformations, target systems, validation criteria, and other relevant details.

In some embodiments, client device (e.g., test case generator 114, user interface 112, etc.) can be configured to provide a user-friendly environment that assists users throughout the process of creating a test case. For example, when creating or modifying a test case, the client device 102 can perform initial checks to ensure that the entered information is complete, meaningful, and aligned with the requirements of the data pipeline validation, as an aid in identifying any missing, incomplete, or incorrect data in the test case. In some embodiments, feedback (e.g., highlighted fields, notifications, etc.) provided by the test case generator 114 or user interface 112 enable users to create well-formed test cases, ensuring that the test scenarios are meaningful and capable of producing reliable results.

At operation 204, the data pipeline analytic device 104 can establish a connection with the test plan repository 124, facilitating the creation of a comprehensive test plan. This connection enables the data pipeline analytic device 104 to access the test plan repository 124 resources, which may include predefined Python modules, configurations, and other relevant information required for generating the test plan.

Furthermore, at operation 204, one or more connections can be established between the data pipeline analytic device 104 and the relational data store 106, thereby enabling the validation of one or more pipelines defined within the relational data store 106. By establishing these connections, the data pipeline analytic device 104 gains access to the data stored in the relational data store 106, allowing the data pipeline analytic device 104 to perform comprehensive validation, analysis, and comparison of the data, ensuring the accuracy, completeness, and adherence to predefined business rules.

At operation 206, the data pipeline analytic device 104 can parse and analyze the test case to facilitate the selection of appropriate Python modules for the pipeline validation procedure. To accomplish this, the data pipeline analytic device 104 can utilize a query generation module 118, which incorporates advanced techniques such as a trained neural network or natural language processing (NLP) to utilize semantic understanding to identify the required functionalities and corresponding Python modules that align with the specified requirements.

By employing NLP techniques, the data pipeline analytic device 104 can interpret the natural language within the configuration entries, extracting the essential information and discerning the intended operations. In embodiments, this can involve various NLP functions, such as tokenization, part-of-speech tagging, syntactic analysis, and semantic understanding. These NLP functions allow the device to identify keywords, entities, and relationships within the configuration entries, enabling the generation of a more precise and accurate test plan.

Furthermore, the NLP capabilities within the query generation module 118 can aid in determining the sequence of the selected Python modules based on the configuration entries. In particular by comprehending the semantics and dependencies implied within the configuration entries, the data pipeline analytic device 104 can organize and arrange the Python modules in a logical sequence that aligns with the desired data pipeline validation process as an aid in ensuring that the operations and transformations specified in the configuration entries are executed in the appropriate order during the validation procedure.

At operation 208, the data pipeline analytic device 104 executes the test case and conducts the required validation procedures to ensure the accuracy, correctness, and consistency of the data flowing through the pipelines established within the relational data store 106. To optimize efficiency, certain embodiments leverage the use of distributed collections, enabling efficient storage and processing of the validation results. By employing distributed collections, the data pipeline analytic device 104 can efficiently store and organize the validation results, facilitating streamlined result comparison and analysis.

At operation 210, the data pipeline analytic device 104 can capture and store relevant metadata associated with the validation results obtained from the execution of the test plan, which can serve as a resource for future reference, analysis, and auditing purposes. Additionally, operation 210 may encompass various sub-operations to enhance the pipeline validation process.

One such sub-operation is count comparison 212, which can compare the counts of data elements, such as records or transactions, before and after specific operations in the test plan. The comparison can aid in ensuring the integrity and accuracy of data during the validation process. In particular, comparing accounts makes it possible to identify discrepancies or inconsistencies that may have occurred during the data transformation and processing stages, thereby enabling a thorough assessment of the data pipeline's functionality and helps maintain data integrity throughout the validation process.

Another sub-operation is data comparison 214, which serves to compare the actual data values generated by the test plan with the expected values specified in the test case. By conducting such a comparison, any discrepancies or anomalies in the data pipeline can be identified to ensure adherence to predefined business rules, validation criteria, and expected outcomes can be effectively verified, strengthening confidence in the integrity of the data pipeline.

Another sub-operation is schema comparison 216, which is configured to compare the structure and attributes of the data between different stages of the pipeline to verify the consistency and adherence to predefined schema definitions throughout the data processing stages. Another sub-operation is Data Quality (DQ) checks 218, which is configured to evaluate the quality and validity of the data by performing various checks, such as checking for data completeness, uniqueness, accuracy, and adherence to predefined data quality standards. It helps ensure the reliability and trustworthiness of the data in the pipeline. Another sub-operation is test case integration 220, which involves integrating multiple test cases or scenarios to validate the entire data pipeline end-to-end to verify the seamless flow of data and the successful execution of the complete set of operations defined in the test cases.

Another sub-operation is auditing and logging 222, which is configured to capture detailed information about the execution of the test plan, including timestamps, configuration settings, actions performed, and any errors or exceptions encountered. It facilitates traceability, auditability, and compliance with regulatory requirements. Another sub-operation is a results snapshot 224, which is configured to capture a snapshot of the results at a specific point in time during the validation process to provide a reference point for comparison and analysis, especially when dealing with large volumes of data or time-series analysis. Yet another sub-operation is a test results capture 226, which involves the systematic capture and storage of the test results, including the validation outcomes, error messages, and any other relevant information. It ensures that the results are securely stored for further analysis and reporting.

In some embodiments, the data pipeline validation method 200 can be used to validate existing processes by validating the pipelines between the nodes or units of a relational data store 106. In one nonlimiting example, the method 200 can be applied to test the connections within a process designed to determine a credit score for an individual, which can generally involve pulling data from various sources and feeding it into a formula to calculate the credit score.

In this example, the relational data store 106 may include: a customer information node (e.g., Store A) configured to store personal identification details, employment history, and other relevant demographic information; a financial data node (e.g., Store B) configured to store financial statements, transaction records, and credit account details, a public records node (e.g., Store C) configured to store legal and public records related to an individual's financial history, a credit bureau data node (e.g., Store D) configured to store credit reports, credit scores and credit history data provided by external credit bureaus, and a scoring model node (e.g., Store E) configured to store the mathematical formula or algorithm used to compute the credit score. During the process of calculating the credit score, relevant data may be extracted from the various nodes, with transformations or calculations applied to the extracted data prior to feeding the data into the scoring model node to compute the credit score.

By utilizing the data pipeline validation method 200, it becomes possible to conduct comprehensive testing and validation of the connections and data flows between the nodes or units within the relational data store 106. In particular, the data pipeline validation method 200 can isolate and observe specific portions of a process involving two or more nodes or units. This isolation enables focused examination of the connections between these nodes or units, independently verifying their integrity and functionality. By performing thorough validation using the data pipeline validation method 200, any potential issues or discrepancies in the data flows or connections can be identified, rectified, and subsequently optimized to ensure smooth and accurate credit score determination.

As illustrated in FIG. 3, the query generation module 118 can include a number of sub-components to facilitate efficient and effective validation, which can include a configuration parser module 126, a module selector module 128, an integration manager module 130, a configuration parameterizer module 132, and a test plan generator module 134.

In some embodiments, the configuration parser module 126 can employ Natural Language Processing (NLP) techniques to break down the test case, enabling it to establish a semantic understanding of the configuration entries. By comprehending the meaning and context of the configuration entries, the configuration parser module 126 can gain valuable insights into the requirements and objectives of the validation process.

For example, the configuration parser module 126 can be configured to segment the configuration entries into individual tokens which can aid in identifying and isolating specific words, phrases, and entities within the configuration entries to enable the configuration parser module 126 to gain a granular view of the information present in the test case. Thereafter, the configuration parser module 126 can perform part-of-speech tagging, to assign grammatical categories to each token, such as nouns, verbs, adjectives, and adverbs, which aids in extracting the syntactic structure of the configuration entries, allowing for a deeper understanding of how different elements relate to each other. The configuration parser module 126 can then employ syntactic parsing, which involves analyzing the grammatical structure of the configuration entries to identify the relationships between different words and phrases as an aid in establishing the dependencies and hierarchical structure within the configuration entries, allowing for a more comprehensive understanding of their intent and purpose.

Additionally, the configuration parser module 126 may employ named entity recognition to identify and extract specific entities within the configuration entries, which can include identifying names of systems, parameters, fields, or any other relevant entities that play a crucial role in the validation process. Once the analysis of the configuration entries is complete, the configuration parser module 126 can integrate the information obtained from the NLP techniques for the establishment of a semantic understanding of the configuration entries, thereby enabling the configuration parser module 126 to discern the requirements, objectives, and specifications of the validation process.

Natural language processing modules can be trained to assist in both the selection and ordering of Python modules within the completed test plan based on the identified keywords, entities, and relationships within the configuration entries. Training NLP models for this purpose can involve several steps to enable accurate and meaningful interpretation of the configuration entries. In particular, relevant training data is collected, including a diverse set of test cases with associated configuration entries. The test cases ideally cover various scenarios and encompass a wide range of keywords, entities, and relationships. The collected data is then annotated to highlight the important components, such as keywords, entities, and relationships within the configuration entries, which provides the labeled data necessary for training the NLP model.

Using the annotated data, the NLP model can be trained using machine learning algorithms, such as deep learning or statistical models. The algorithms can be configured to learn patterns and relationships between the identified components, allowing the model to recognize and understand the semantics and context of the configuration entries. During training, the NLP model can extract relevant features from the configuration entries, such as word embeddings, syntactic structures, and semantic representations to capture the underlying meaning and associations within the entries, facilitating the identification of appropriate Python modules and their ordering. Finally, the trained NLP model can be evaluated using test data to assess its performance and accuracy. Thereafter, if necessary, the NLP model can be refined and iterated upon by adjusting hyperparameters, modifying training strategies, or incorporating additional annotated data.

Working in conjunction with the test plan repository 124, the module selector module 128 can be configured to select one or more Python modules specifically configured to carry out the validation tasks outlined by the configuration entries. The intelligent selection process involving a semantic understanding of the configuration entries aids in ensuring that the chosen modules possess the necessary functionalities to fulfill the validation requirements.

The configuration parameterizer module 132 can be configured to serve in configuring the Python modules with specific attributes derived from the configuration entries. For example, the configuration parameterizer module 132 can adapt pre-existing Python modules (e.g., stored in the test plan repository 124) by adding variable limitations relevant to the pipeline validation (e.g., a date range, targeted amount or value, or a specific formula) to be applied.

The test plan generator module 134 is configured to integrate the configured Python modules to generate the final test plan representing a comprehensive set of instructions which can include specific SQL statements, data processing steps, validation criteria, and any additional actions required for testing the pipeline. In some embodiments, test plan generator module 134 can prepare the final test plan for execution.

Figure 4:
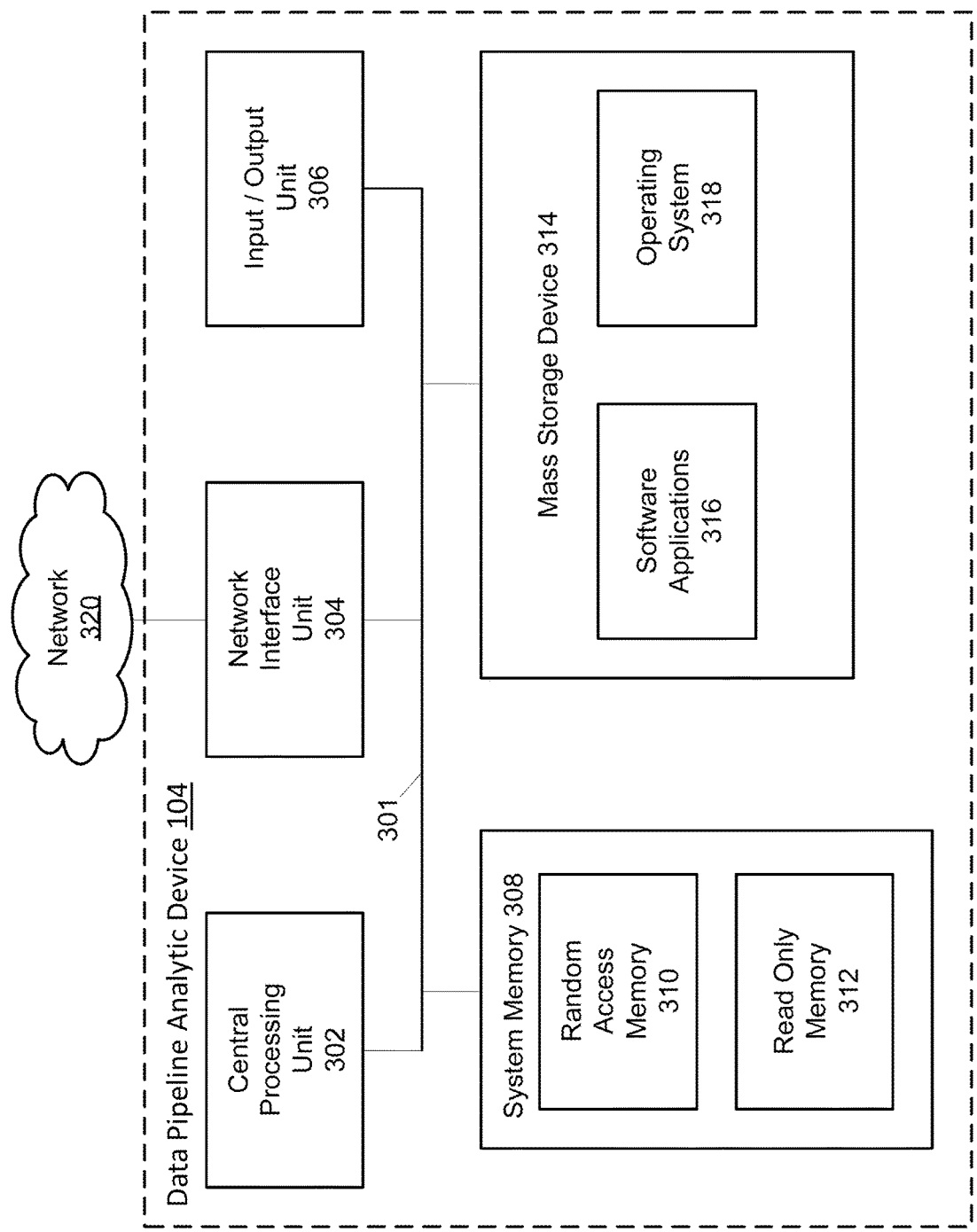
FIG. 4 shows example physical components of the data pipeline analytic device of FIG. 1.

As illustrated in the embodiment of FIG. 4, the example data pipeline analytic device 104, which provides the functionality described herein, can include at least one central processing unit (CPU) 302, a system memory 308, and a system bus 301 that couples the system memory 308 to the CPU 302. The system memory 308 includes a random access memory (RAM) 310 and a read-only memory (ROM) 312. A basic input/output system containing the basic routines that help transfer information between elements within the data pipeline analytic device 104, such as during startup, is stored in the ROM 312. The data pipeline analytic device 104 further includes a mass storage device 314. The mass storage device 314 can store software instructions and data. A central processing unit, system memory, and mass storage device similar to that shown can also be included in the other computing devices disclosed herein.

The mass storage device 314 is connected to the CPU 302 through a mass storage controller (not shown) connected to the system bus 301. The mass storage device 314 and its associated computer-readable data storage media provide non-volatile, non-transitory storage for the data pipeline analytic device 104. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs (DVDs), other optical storage media, magnetic cassettes, magnetic tape, magnetic disk storage or other magnetic storage devices, or any other medium which can be used to store the desired information and which can be accessed by the data pipeline analytic device 104.

According to various embodiments of the invention, the data pipeline analytic device 104 may operate in a networked environment using logical connections to remote network devices through network 320, such as a wireless network, the Internet, or another type of network. The network 320 provides a wired and/or wireless connection. In some examples, the network 320 can be a local area network, a wide area network, the Internet, or a mixture thereof. Many different communication protocols can be used.

The data pipeline analytic device 104 may connect to network 320 through a network interface unit 304 connected to the system bus 301. It should be appreciated that the network interface unit 304 may also be utilized to connect to other types of networks and remote computing systems. The data pipeline analytic device 104 also includes an input/output controller 306 for receiving and processing input from a number of other devices, including a touch user interface display screen or another type of input device. Similarly, the input/output controller 306 may provide output to a touch user interface display screen or other output devices.

As mentioned briefly above, the mass storage device 314 and the RAM 310 of the data pipeline analytic device 104 can store software instructions and data. The software instructions include an operating system 318 suitable for controlling the operation of the data pipeline analytic device 104. The mass storage device 314 and/or the RAM 310 also store software instructions and applications 316, that when executed by the CPU 302, cause the data pipeline analytic device 104 to provide the functionality of the data pipeline analytic device 104 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for validating a data pipeline in a distributed computing environment, comprising:
   receiving a test case from a client device, wherein the test case is configured to be executed in parallel across at least two nodes or machines of a relational data store;
   parsing the test case to extract one or more configuration entries;
   analyzing the one or more configuration entries to determine an associated one or more functions;
   selecting one or more prewritten modules to perform the associated one or more functions;
   determining a run time order for the one or more prewritten modules; and
   assembling the one or more prewritten modules together to form a test plan.

2. The method of claim 1, further comprising executing the test plan on the distributed computing environment, and storing relevant metadata associated with validation results obtained from execution of the test plan.

3. The method of claim 2, further comprising comparing the validation results with one or more expected results.

4. The method of claim 1, further comprising processing via a natural language processing algorithm to analyze the one or more configuration entries to determine the associated one or more functions.

5. The method of claim 4, further comprising training the natural language processing algorithm using a body of configuration entries and their corresponding desired associated functions.

6. The method of claim 1, further comprising establishing a connection between the client device, the relational data store, and a test plan repository configured to store the one or more prewritten modules.

7. The method of claim 1, wherein the test case is represented in a JavaScript Object Notation format.

8. The method of claim 1, wherein validation results are stored in one node or machine of the relational data store.

9. A method for validating a data pipeline in a distributed computing environment, comprising:
   receiving a test case from a client device;
   parsing the test case to extract one or more configuration entries;
   analyzing the one or more configuration entries to determine an associated one or more functions;
   selecting one or more prewritten modules to perform the associated one or more functions;
   determining a run time order for the one or more prewritten modules; and
   assembling the one or more prewritten modules together to form a test plan, wherein the test plan is represented in a dynamic Standard Query Language format, enabling modification of portions of a Standard Query Language format code with relevant variable values.

10. A computer system for file aggregation, comprising:
    one or more processors; and
    non-transitory computer readable storage media encoding instructions which, when executed by the one or more processors, causes the computer system to:
    receive a test case from a client device;
    parse the test case to extract one or more configuration entries;
    analyze the one or more configuration entries to determine an associated one or more functions;
    select one or more prewritten modules to perform the associated one or more functions;
    determine a run time order for the selected one or more prewritten modules; and
    assemble the one or more prewritten modules together to form a test plan, wherein the test plan is represented in a dynamic Standard Query Language format, enabling modification of portions of a Standard Query Language format code with relevant variable values.

11. The computer system of claim 10, wherein the one or more processors are further configured to cause the computer system to execute the test plan, and store relevant metadata associated with validation results obtained from execution of the test plan.

12. The computer system of claim 11, wherein the one or more processors are further configured to cause the computer system to compare the validation results with one or more expected results.

13. The computer system of claim 10, wherein the one or more processors are further configured to cause the computer system to process utilize a natural language processing algorithm to analyze the one or more configuration entries to determine the associated one or more functions.

14. The computer system of claim 13, further comprising training the natural language processing algorithm using a body of configuration entries and their corresponding desired associated functions.

15. The computer system of claim 10, wherein the one or more processors are further configured to cause the computer system to establish a connection between the client device, a relational data store, and a test plan repository configured to store the one or more prewritten modules.

16. The computer system of claim 10, wherein the test case is represented in a JavaScript Object Notation format.

* * * * *